United States Patent
Park et al.

(10) Patent No.: US 8,227,715 B2
(45) Date of Patent: Jul. 24, 2012

(54) KEYPAD ASSEMBLY FOR MOBILE PHONE

(75) Inventors: Jung-Won Park, Gyeonggi-do (KR);
Jong-Chul Shin, Gyeonggi-do (KR);
Jong-Kyun Shin, Seoul (KR);
Young-Bae Ji, Gyeonggi-do (KR)

(73) Assignee: Samsung Electronics Co., Ltd.,
Samsung-ro, Yeongtong-gu, Suwon-si,
Gyeonggi-do (KR)

( * ) Notice: Subject to any disclaimer, the term of this patent is extended or adjusted under 35 U.S.C. 154(b) by 260 days.

(21) Appl. No.: 12/696,288

(22) Filed: Jan. 29, 2010

(65) Prior Publication Data
US 2010/0200386 A1 Aug. 12, 2010

(30) Foreign Application Priority Data
Feb. 10, 2009 (KR) .................. 10-2009-0010680

(51) Int. Cl.
*H01H 9/26* (2006.01)

(52) U.S. Cl. .................................. 200/5 A; 200/520
(58) Field of Classification Search ............... 200/5 A,
200/314, 511–513, 520; 345/168
See application file for complete search history.

(56) References Cited

U.S. PATENT DOCUMENTS

| | | | | |
|---|---|---|---|---|
| 4,158,230 A | * | 6/1979 | Washizuka et al. | 708/142 |
| 4,302,647 A | * | 11/1981 | Kandler et al. | 200/512 |
| 2009/0008234 A1 | * | 1/2009 | Tolbert et al. | 200/600 |
| 2011/0038115 A1 | * | 2/2011 | Halkosaari | 361/679.08 |

* cited by examiner

*Primary Examiner* — Vanessa Girardi
(74) *Attorney, Agent, or Firm* — Cha & Reiter, LLC (57) ABSTRACT

A keypad assembly mounted in a portable terminal is disclosed. The keypad assembly has a window keypad including a display window disposed on a front face of the portable terminal. A keypad top is integrally molded with the display window and simultaneously assembled on the front face of the portable terminal, thereby providing an easier assembly than known heretofore, as two parts can be assembled at the same time and additionally provide an elegant exterior front face.

19 Claims, 12 Drawing Sheets

KEYPAD ASSEMBLY FOR MOBILE PHONE

CLAIM OF PRIORITY

This application claims the benefit of priority under 35 U.S.C. §119(a) of a Korean Patent Application filed in the Korean Intellectual Property Office on Feb. 10, 2009 and assigned Ser. No. 10-2009-0010680, the entire disclosure of which is hereby incorporated by reference in its entirety.

BACKGROUND OF THE INVENTION

1. Field of the Invention

The present invention relates to portable terminals, including Personal Digital Assistants (PDAs), cellular phones, hand-held phones and smart phones. More particularly, the present invention relates to a cost-reduced keypad assembly mounted in a portable terminal.

2. Description of the Related Art

A common portable terminal represents a number of various portable devices that include a data input/output unit, a transmission/reception unit, an antenna device, a power supply device, etc. and by which a user can wirelessly communicate with the other party. In such a portable terminal, a keypad assembly is mainly used as a data input unit, a display unit is used as a data output device, and a touch screen is typically used as a data input/output device. The keypad assembly allows the user to input desired data by key pressing, and the touch screen with a touch sensitive panel enables the user to input desired data by screen touching and check the input data. A data input/output unit, which is one of the most important components in the portable terminal, is normally disposed on a front face of the terminal body to enable the user to read displayed data easily and to perform key manipulation.

Figure 1:
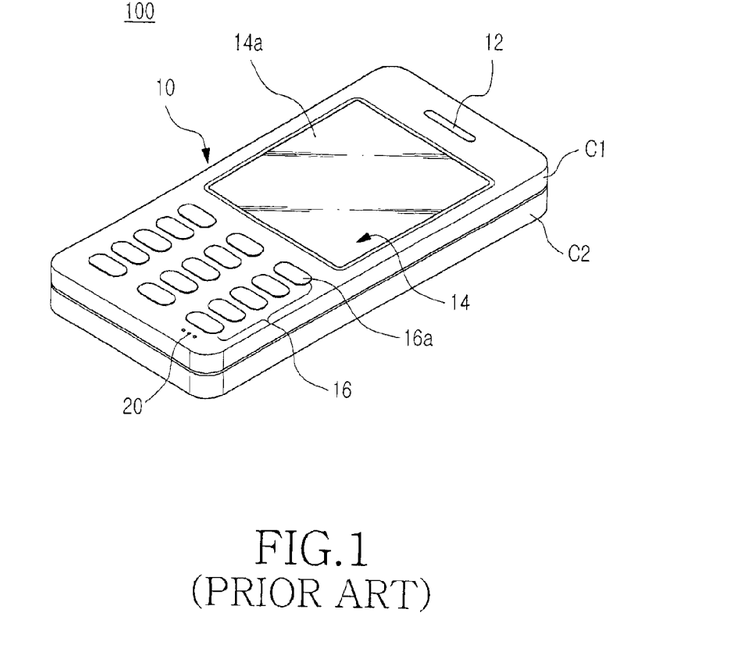
FIG. 1 is a perspective view of a portable terminal according to the prior art.

Referring now to FIG. 1, a conventional portable terminal 100 has a body 10, on the front face of which a speaker device 12, a display unit 14, a keypad assembly 16 and a microphone device 15 are disposed in the order named. The speaker device 12 is typically arranged at an upper end of the body 10 and the microphone device 15 is arranged at a lower end, similar to a conventional telephone. A distance between the speaker device 12 and the microphone device 15 corresponds to an average ear-to-mouth distance of a user.

The display unit 14 is arranged at an upper side of the body 10 so that the user may easily watch the display unit 14, and the keypad assembly 16 is arranged at a lower side of the body 10, so that the user may easily manipulate keys, with one hand gripping the portable terminal. An external casing of a common portable terminal is realized by putting an upper casing C1 and a lower casing C2 together.

The display unit 14 has a display window 14a that preferably can be seen from the exterior, and the keypad assembly 16 has only the key tops 16a exposed to the outside for the user. The display window 14a is made of a transparent acrylic material to enable the user to read data displayed on the display unit 14, and the key tops 16a of the keypad assembly 16 are exposed from the surface of the portable terminal so that the user may input desired data by pressing selected key tops.

Figure 2:
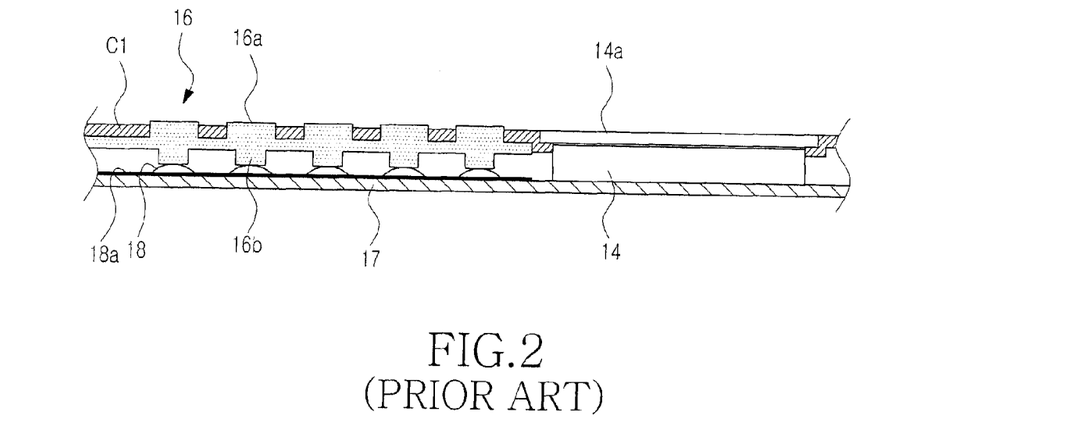
FIG. 2 is a cross sectional view showing a structure of a keypad assembly mounted in a portable terminal according to the prior art such as shown in FIG. 1.

Referring now to FIG. 2, an assembly process of the conventional portable terminal includes coupling the keypad assembly 16 and the display window 14a, which were assembled into separate parts by independent assembly processes, in the upper casing C1 of the body 10. In general, the display window 14a is adhered to a proper place of the upper casing C1 along with an acrylic sheet using adhesive substances. In particular, the display window 14a is coupled with a lower side of the upper casing C1 along with a display unit or an undepicted touch sensitive panel.

Figure 3:
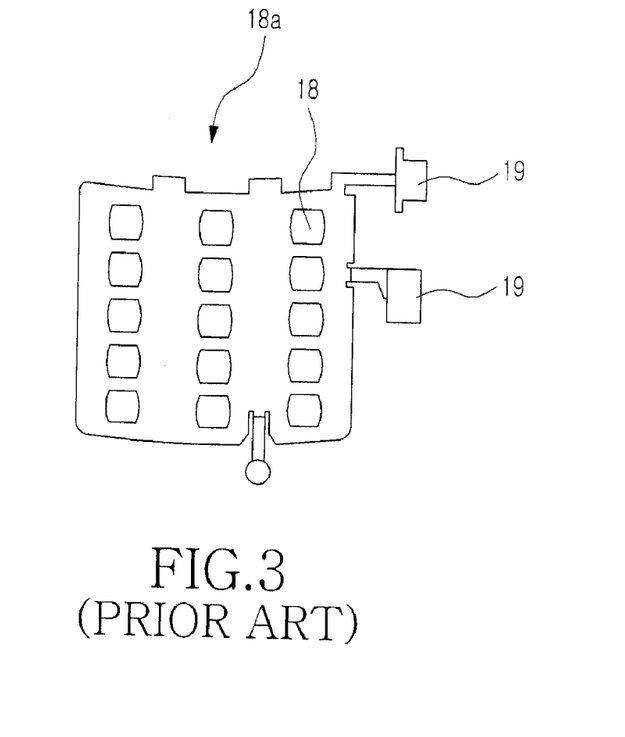
FIG. 3 is a front view of a dome sheet FPCB in a keypad assembly according to the prior art.

Referring to FIGS. 2 and 3, metal domes 18 are formed on a single dome sheet Flexible Printed Circuit Board (FPCB) 18a, facing actuators 16b, with the dome sheet FPCB 18a adhered to a Printed Circuit Board (PCB) 17. Connectors 19 provided on the dome sheet FPCB 18a, as illustrated in FIG. 3, are connected to undepicted connectors on the PCB 17 to ensure a proper electrical signal connection.

In the structure shown in FIG. 1, if the user presses down any one of the key tops 16a, a relevant actuator 16b (shown in FIG. 2) on the keypad assembly 16 presses its associated metal dome 18 arranged on the PCB 17, thereby applying a signal. If the applied force is removed, the actuator 16b returns to its original location and the key top 16a also returns to its original position. The key tops 16a and the actuators 16b are made of silicon rubber to secure a desired elastic force.

As another example, even though an undepicted touch sensitive panel is provided on the portable terminal as a data input device, so as to take the place of the keypad assembly 16, wherein the touch sensitive panel and the display window 14a are assembled by independent assembly processes.

However, in the conventional portable terminal assembly process, the keypad assembly is independently assembled in the upper casing and the display window is also separately assembled in or attached to a proper place of the upper casing, causing an increase in manhour and thus reducing productivity. In addition, the key tops on the conventional keypad assembly should be assembled in keypad holes formed in the upper casing, reducing some steps and providing improved assembly (easier construction) as well.

Further, in the conventional assembly process, the dome sheet FPCB is attached onto the PCB and then connectors thereon are connected to undepicted connectors on the PCB, increasing the man-hours for assembly and thus causing a reduction in productivity.

In addition, the keypad assembly and the display window, which are assembled separately, are then assembled in the upper casing of the body, becoming an obstacle to an elegant external design of the portable terminal. That is, there is a limitation in providing a simple exterior design of the portable terminal.

SUMMARY OF THE INVENTION

An aspect of the present invention is to provide a keypad assembly for a portable terminal, the cost of which is reduced by maximizing time and cost reduction in a portable terminal assembly process.

Another exemplary aspect of the present invention provides a keypad assembly having an elegant exterior by simplifying a design of a front face of a portable terminal.

Another exemplary aspect of the present invention provides a keypad assembly with improved "click" feeling when pressing the keys.

According to one exemplary aspect of the present invention, there is provided a keypad assembly for a portable terminal. The keypad assembly includes a window keypad including a display window and a keypad top that is integrally molded with the display window and assembled on a front face of the portable terminal.

Preferably, according to an exemplary aspect of the present invention, the display window may be assembled on the front face of the portable terminal on a same plane as that of the keypad top, in a vertical downward direction.

Preferably, according to an exemplary aspect of the present invention, the keypad top may preferably include a plurality of contact bosses projecting in a bottom direction, and the contact bosses are made of an elastic material and adhered to a bottom of the keypad top.

Preferably, according to an exemplary aspect of the present invention, the keypad top may have a plurality of key tops that are integrally molded in the form of a panel.

Preferably, according to an exemplary aspect of the present invention, there can be various alphanumeric letters and symbols are printed on a bottom of the keypad top.

Preferably, according to an exemplary aspect of the present invention, the plurality of contact bosses may be integrally molded on one sheet, which is adhered to a bottom of the keypad top, so that the plurality of contact bosses face in a bottom direction.

Preferably, according to an exemplary aspect of the present invention, the sheet and the plurality of contact bosses may be made of the same material, and integrally molded with a material of silicon rubber.

Preferably, according to an exemplary aspect of the present invention, a bottom of the keypad top and a top of the sheet may be formed flat.

According to another exemplary aspect of the present invention, there is provided a keypad assembly for a portable terminal. The keypad assembly includes a window keypad including a keypad top with a plurality of key tops being integrally formed thereon, and assembled on a front face of the portable terminal in a vertical downward direction; an elastic body being assembled onto a bottom of the keypad top and being movable by pressure of a selected key top; a board including a dome sheet that is disposed under the elastic body face-to-face; and a key bracket interposed between the keypad top and the elastic body to transfer the pressure of the key top to the dome sheet.

Preferably, the window keypad may have, for example, a display window adhered to a bottom thereof.

In addition, it is preferable that the key bracket may include a plurality of key bodies associated with the key tops, and the key bodies may be integrally molded.

Preferably, according to an exemplary aspect of the invention, the key bodies may be made of a rigid material.

Preferably, according to an exemplary aspect of the invention, the key bodies may be integrally connected to one other by a plurality of connecting portions.

Preferably, according to an exemplary aspect of the invention, the key bracket may be made of transparent plastics and serve as a waveguide.

In addition, the elastic body may have a plurality of openings formed in associated places between the plurality of key bodies to facilitate smooth pressure and recovery of the key tops.

Moreover, each of the openings may extend in a horizontal direction between the key bodies, and a plurality of openings may be arranged along a vertical direction between the key bodies.

More preferably, according to an exemplary aspect of the invention, the elastic body may have a plurality of holders integrally molded along a circumference thereof, and may be fixed to a predetermined place of the portable terminal.

Preferably, a plurality of actuators projecting in a bottom/lower direction may be integrally molded at places corresponding to the key bodies on a bottom of the elastic body.

Preferably, there can be formed on the bottom of the elastic body along circumferences of the actuators to facilitate smooth pressure and recovery of the actuators.

Finally, according to an exemplary aspect of the invention, the elastic body may be made of a semi-transparent material and serve as a waveguide.

BRIEF DESCRIPTION OF THE DRAWINGS

The above and other exemplary aspects, features and advantages of certain exemplary embodiments of the present invention will be more apparent from the following description taken in conjunction with the accompanying drawings, in which.

DETAILED DESCRIPTION

Exemplary embodiments of the present invention are described in detail herein with reference to the accompanying drawings. The same or similar components may be designated by the same or similar reference numerals although they are illustrated in different drawings. Detailed descriptions of constructions or processes known in the art may be omitted to avoid obscuring appreciation of the subject matter of the present invention by a person of ordinary skill in the art. A structure of a keypad assembly mounted in a portable terminal according to a first exemplary embodiment of the present invention will now be described with reference to FIGS. 4 to 8.

Figure 4:
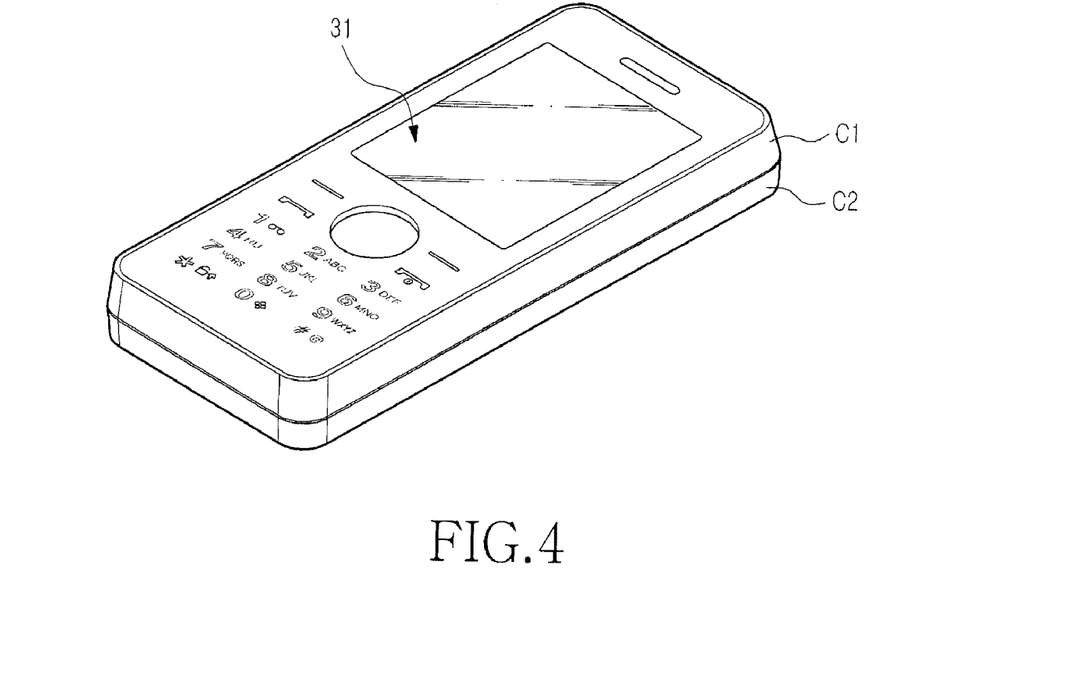
FIG. 4 is a perspective view of a portable terminal mounted with a keypad assembly according to a first exemplary embodiment of the present invention.
Figure 5:
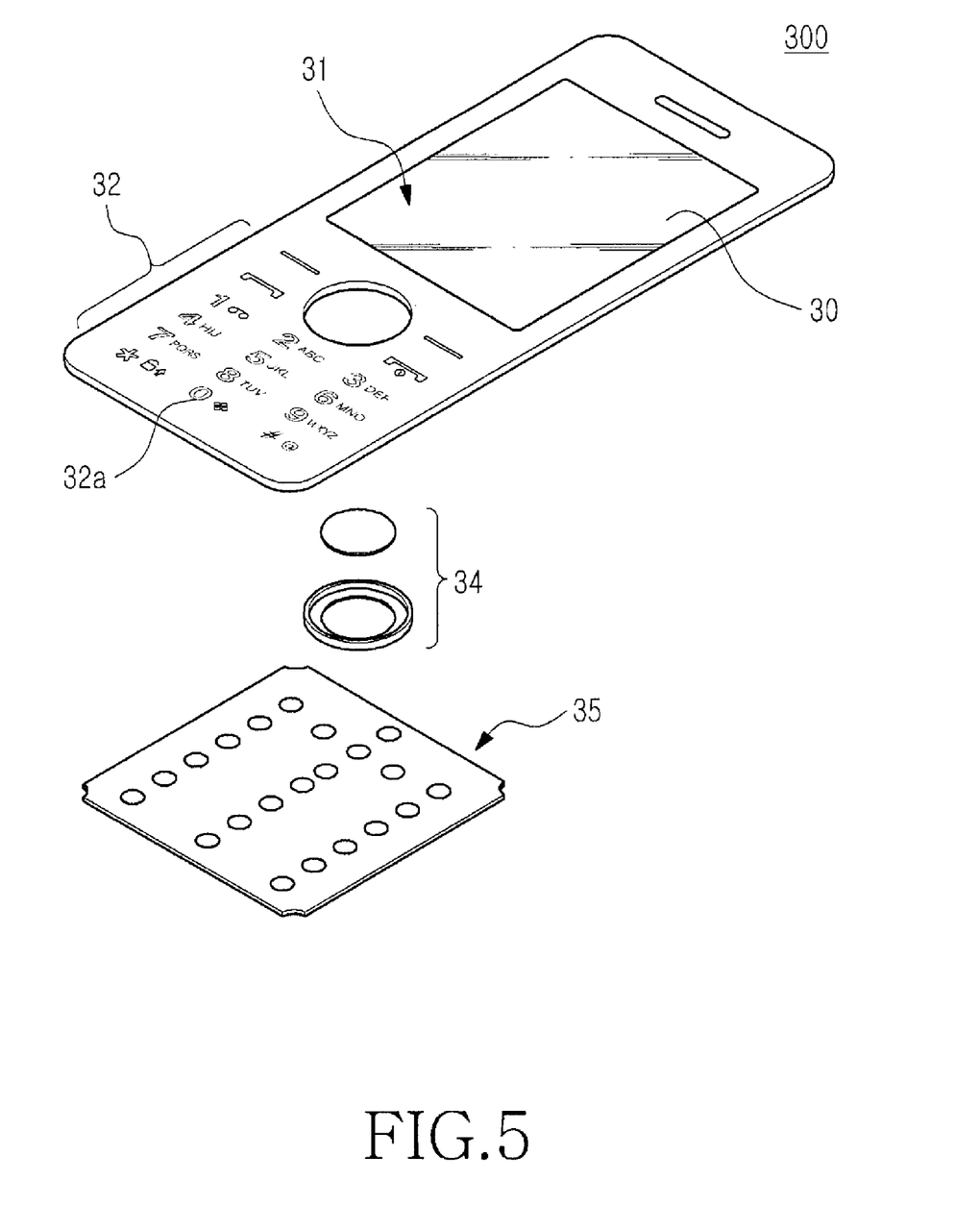
FIG. 5 is an exploded view of a keypad assembly mounted in a portable terminal according to the first exemplary embodiment of the present invention.
Figure 6:
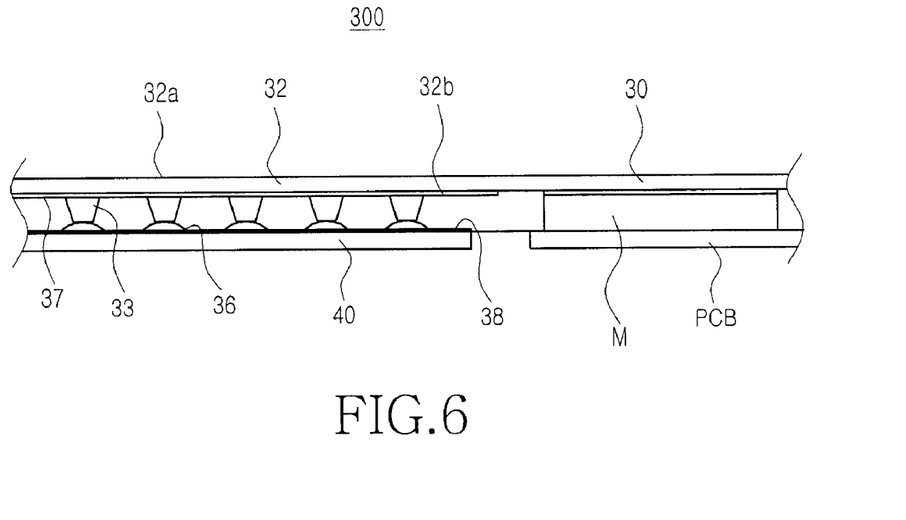
FIG. 6 is a cross-sectional view showing a structure of a keypad assembly according to the first exemplary embodiment of the present invention.

FIG. 4 is a perspective view of a portable terminal mounted with a keypad assembly according to a first exemplary embodiment of the present invention. FIG. 5 is an exploded view showing a structure of a keypad assembly according to the first exemplary embodiment of the present invention. FIG. 6 is a cross-sectional view showing a structure of a keypad assembly according to the first exemplary embodiment of the present invention.

Referring now to FIGS. 4 to 6, a keypad assembly 300 according to the first exemplary embodiment of the present invention, which is a data input device designed with improved assembly under consideration, includes a window keypad 31 that is preferably mounted on a front face of the portable terminal. The window keypad 31 includes a display window 30 (FIG. 5) arranged at an upper side and a keypad top 32 that is integrally formed with the display window 30 at a lower side and simultaneously assembled in alignment with the display window 30. That is, the keypad assembly 300 has the window keypad 31 in the form of a single panel, which is made by integrally injection-molding the display window 30 and the keypad top 32. The window keypad 31, i.e., the display window 30 and the keypad top 32 are molded into a single part in the form of a thin-plate panel, assembled in an upper casing and arranged on the same plane on the front face of the portable terminal.

The phrase "front face of a portable terminal" as stated herein typically refers to an area that faces the user who grips the portable terminal. Generally, a front face of the common portable terminal includes thereon a speaker device, a display unit, a keypad assembly, and a microphone device. Reference numeral 34 in FIG. 5 indicates a navigation key and reference numeral 35 represents a dome sheet PCB.

Referring now to FIG. 6, the keypad assembly 300 includes at the bottom thereof a plurality of contact bosses 33 that project in the bottom (lower) direction. The contact bosses 33 are preferably made of an elastic material and adhered to the bottom 32b of the keypad top 32.

More particularly, the contact bosses 33 can be made of a silicon rubber material, which is an elastic material, so as to secure an elastic force by itself. The contact bosses 33 are preferably shaped in the form of a half cone. The contact bosses 33 are arranged such one side if each boss is adhered to the bottom 32b of the keypad top 32 while the other sides come in contact with or comes substantially in contact with the metal domes 36.

The contact bosses 33 are provided to press down the metal domes 36 engaged on a PCB 40 provided in the portable terminal. That is, the contact bosses 33 are provided to press down the metal domes 36 by user's key pushing, so that the metal domes 36 make contact with the PCB 40.

In accordance with an exemplary aspect of the present invention, the contact bosses 33 are preferably provided on a single sheet 37 for a high rate of constructability and the sheet 37 is preferably adhered to the bottom 32b of the keypad top 32, with the contact bosses 33 projecting in the bottom direction. That is, a top surface of the sheet 37 is adhered to the bottom 32b of the keypad top 32, and the sheet 37 has the contact bosses 33 arranged on its bottom surface. The sheet 37 and the contact bosses 33 are assembled preferably by being integrally molded and then adhered to the bottom 32b. The sheet 37 and the contact bosses 33 are preferably made of the same material, especially a silicon rubber material. Particularly, the sheet 37 and the contact bosses 33 are made of a semi-transparent silicon rubber material to propagate light received from undepicted light sources. That is, the sheet 37 and the contact bosses 33 also serve as waveguides for the undepicted light sources.

The sheet 37 on which the contract bosses 33 are formed is preferably adhered to the bottom 32b of the keypad top 32 entirely by one assembly process or one adhesion process.

As another example, the contact bosses 33 may be integrally injection-molded on the bottom 32b of the keypad top 32.

As to the keypad assembly 300 with the structure described above, when the window keypad 31 is mounted on the front face of the portable terminal, the display window 30 is typically provided on the upper side and the keypad top 32 is provided on the lower side, which is integrally arranged with the display window 30 on the same plane. The sheet 37 on which the contract bosses 33 are arranged is preferably adhered to the bottom 32b of the keypad top 32 in the vertical direction or in the bottom direction, the metal domes 36 are arranged in the direction of the bottoms of their associated contact bosses 33, and the metal domes 36 are arranged on the one PCB 40. The metal domes 36 are formed on a single dome sheet, which is engaged onto the PCB 40 by an adhesive agent. The dome sheet on which the metal domes 36 are provided is adhered onto the PCB by one adhesion process.

As illustrated in FIG. 6, a display unit M, especially a Liquid Crystal Display (LCD) module is arranged in the direction of the bottom of the display window 31, and the display unit M is arranged on the PCB. Therefore, if the user presses down on one selected key top 32a on the keypad top 32, the associated contact boss 33 is pushed down and then the associated metal dome 36 is also pressed down by the contact boss 33.

The bottom 32b of the keypad top 32 and the top of the sheet 37 are preferably formed to be flat so as to promote adhesive property between them.

Figure 7:
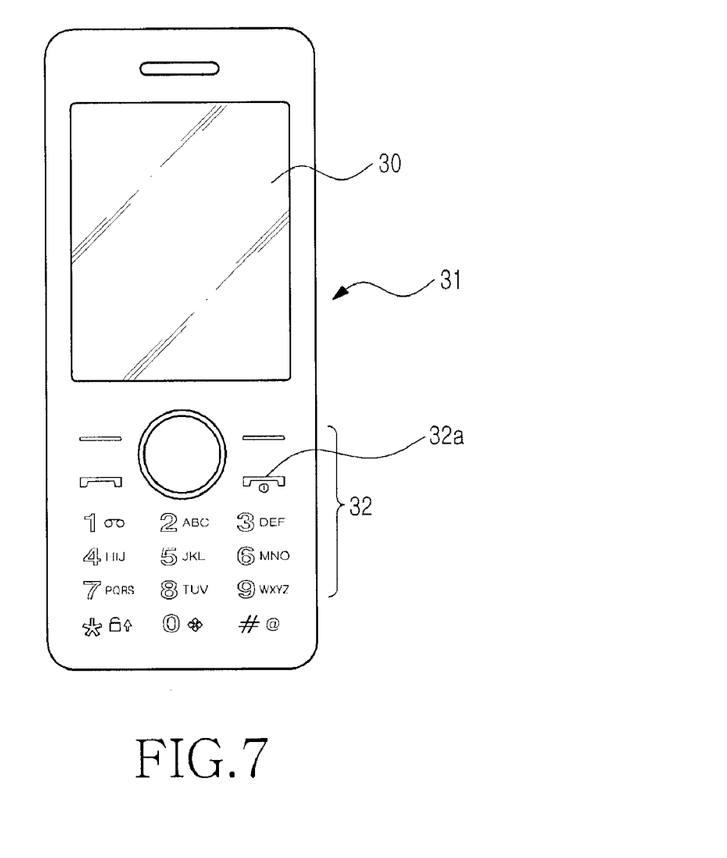
FIG. 7 is a front view of a window keypad on a keypad assembly according to the first exemplary embodiment of the present invention.
Figure 8:
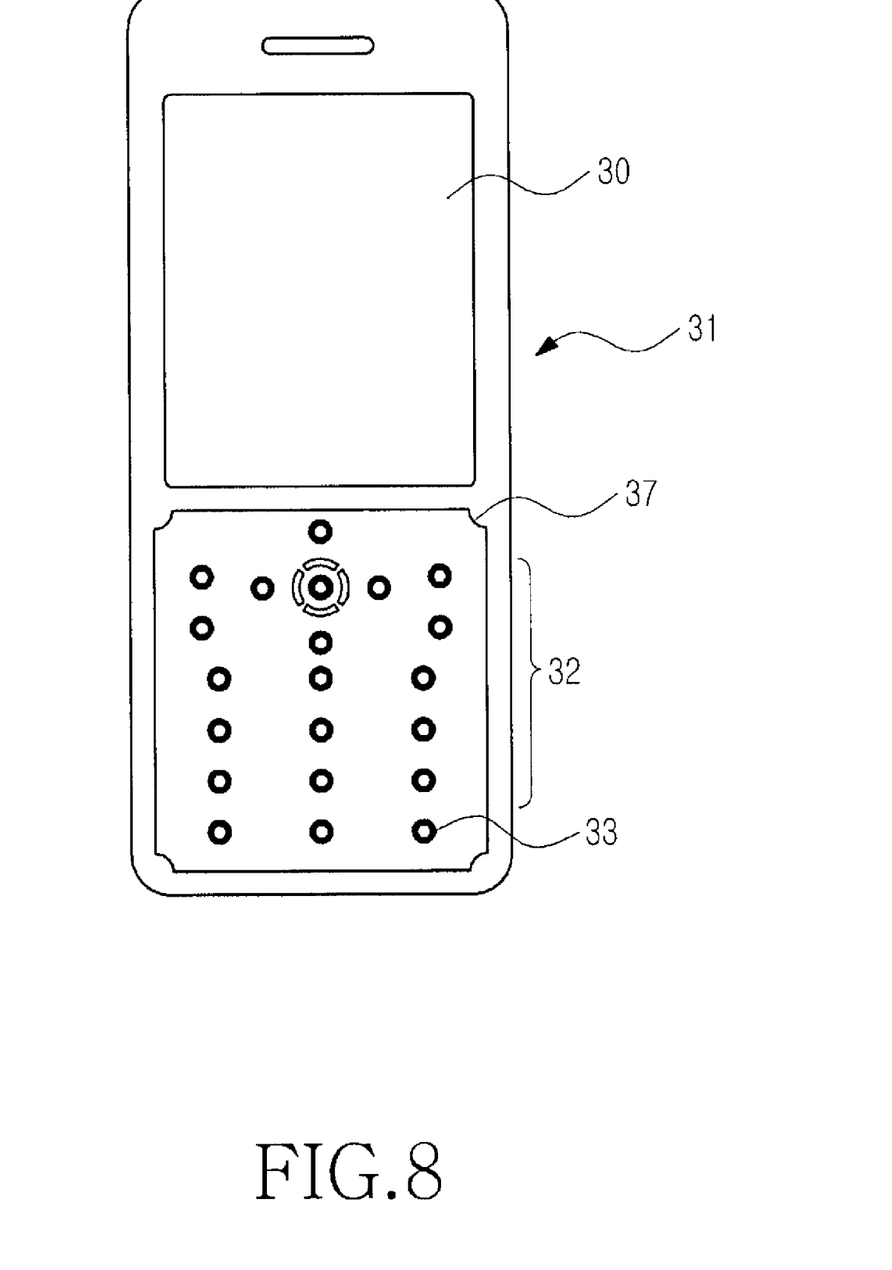
FIG. 8 is a bottom view of the window keypad shown in FIG. 7.

Referring now to FIGS. 7 and 8, the keypad top 32 has a plurality of key tops 32a provided on its top/upper surface as described above, and alphanumeric letters and function-related icons are preferably printed on the key tops 32a. The key tops 32a, on which the alphanumeric letters and function-related icons are printed, are provided on the bottom of the keypad top 32 using a printing method. In FIG. 8, the printed alphanumeric letters and function-related icons are hidden by the attached sheet 37.

A structure of a keypad assembly according to a second exemplary embodiment of the present invention will be described next with reference to FIGS. 9 to 16.

Figure 9:
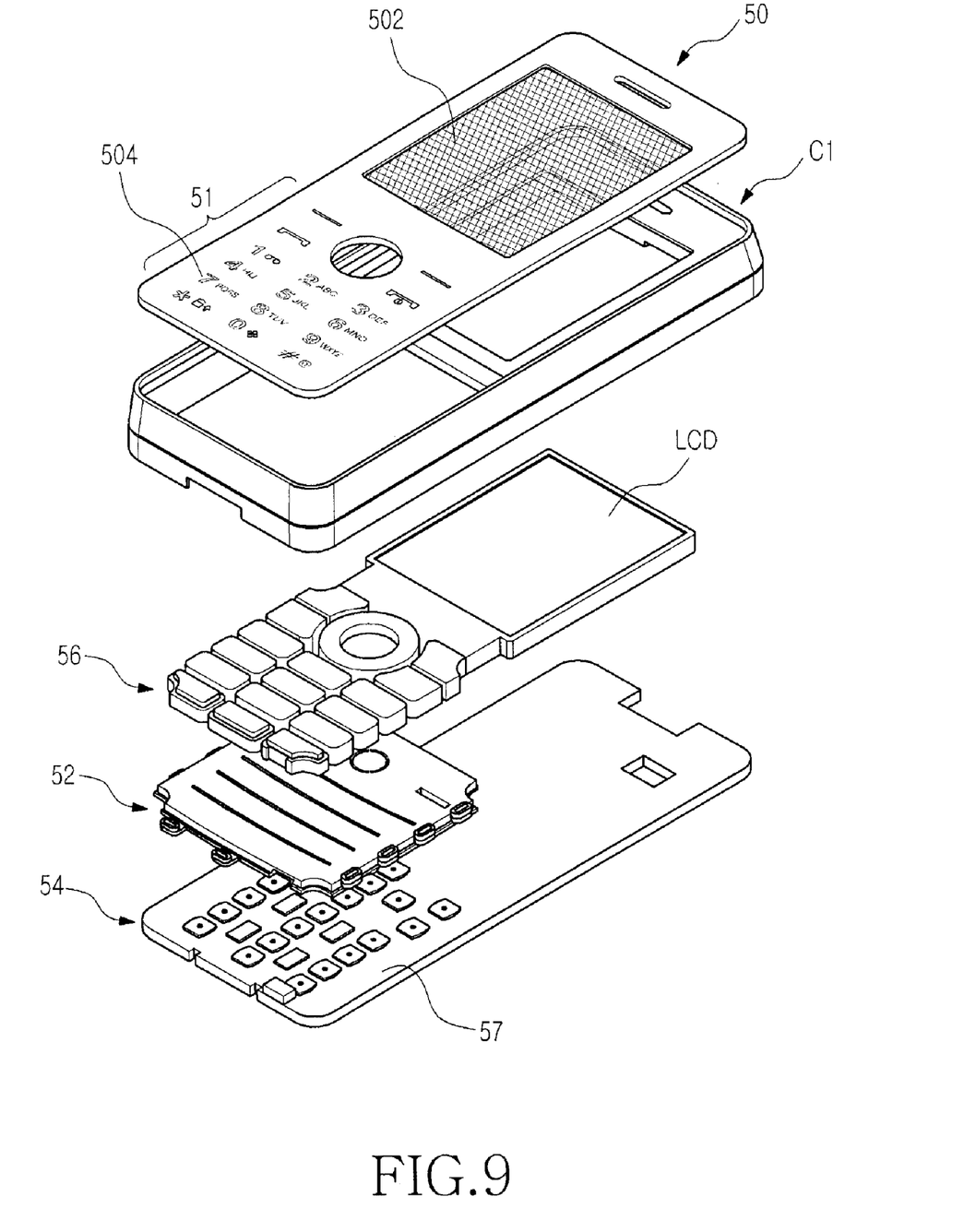
FIG. 9 is a disassembled perspective view showing how to assemble a disassembled keypad assembly in an upper casing of a portable terminal according to a second exemplary embodiment of the present invention.
Figure 10:
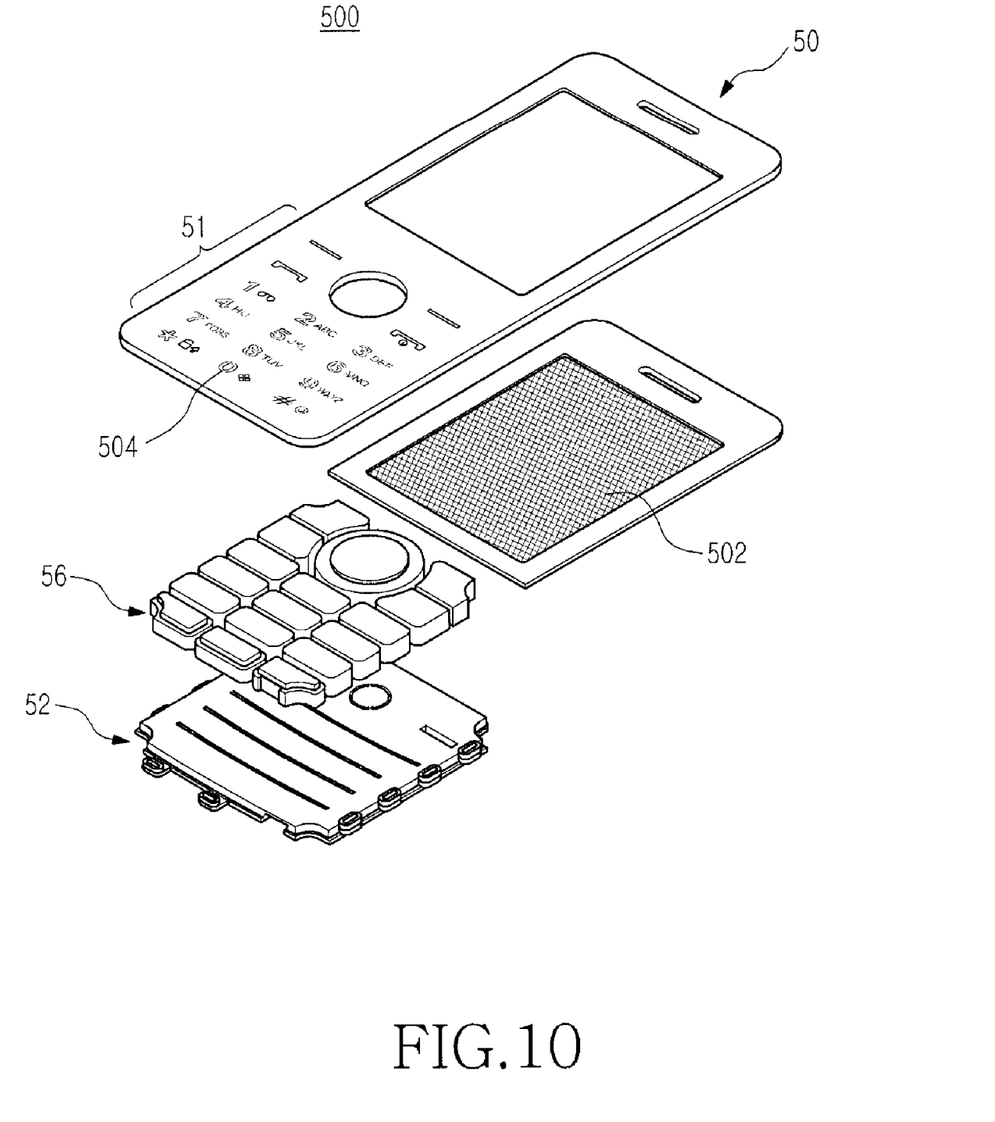
FIG. 10 is an exploded view showing a structure of a keypad assembly according to the second exemplary embodiment of the present invention.

Referring now to FIGS. 9 and 10, a keypad assembly 500 according to the second exemplary embodiment of the present invention is a device aimed at cost reduction in fabrication and having an improved click feeling. It is to be noted that the keypad assembly 500 is a device that has both rigidity and elasticity, when taking thickness of a keypad top into account, in order to provide an improved click feeling. The keypad assembly 500 preferably includes a window keypad 50, an elastic body 52 arranged under the window keypad 50 face-to-face, a PCB 54 including a plurality of metal domes under the bottom of the elastic body 52, and a key bracket 56 engaged between the window keypad 50 and the elastic body 52 to transfer the pressure of the key tops to the associated metal domes.

The window keypad 50, which is provided in the form of a long panel, preferably includes a keypad top 51 on a lower side thereof, on which a plurality of key tops 504 are integrally provided, and has a display window 502 on an upper side. The window keypad 50 is assembled on a front face of an upper casing C1 of the portable terminal in the vertical downward direction, such that the key tops 504 are exposed to the outside. As illustrated in FIG. 10, the display window 502 is assembled by adherence to the bottom of the window keypad 50 after being moved in the vertical (upward) direction from its relative position shown in the exploded view.

Referring now to FIGS. 9, 10, 14A and 14B, the key bracket 56 is engaged between the keypad top and the metal domes to secure a predetermined distance between them. The key bracket 56 is a force transfer device that is engaged between the keypad top 51 and the elastic body 52. In addition, the key bracket 56 is integrally connected to an LCD module. That is, one side of the key bracket 56 is connected to the LCD module and firmly fixed thereto.

If a thickness of the keypad top 51 is too small when considering the force of pressure exerted, a structure in which the display window is installed in the display unit is weak, thereby causing a problem. However, if the thickness is too large when considering the rigidity, an elastic force of the keypad top 51 decreases, deteriorating the click feeling caused by the pressure and thus causing an erroneous operation. Thus, a thickness of the key bracket 56 is determined by securing a distance between the keypad top 51 and metal domes 571 (shown in FIG. 16). That is, if the key bracket 56 is mounted, a thin-plate keypad top having an installation rigidity of the display unit can be manufactured that maintains a proper thickness of the keypad top 51 and directly transfers a force by the pressure of the keypad top 51 to the metal domes 571.

If a distance between the keypad top 51 and the metal domes 571 is relatively long, a height of protrusions on actuators 540 on the elastic body 52 should increase, which also causes unstable key pressing and reduces click feeling. In order to improve stability of key pressing and click feeling by key pressing, the key bracket 56 is used herein to secure a desired distance between the keypad top 51 and the metal domes 571.

Figure 13:
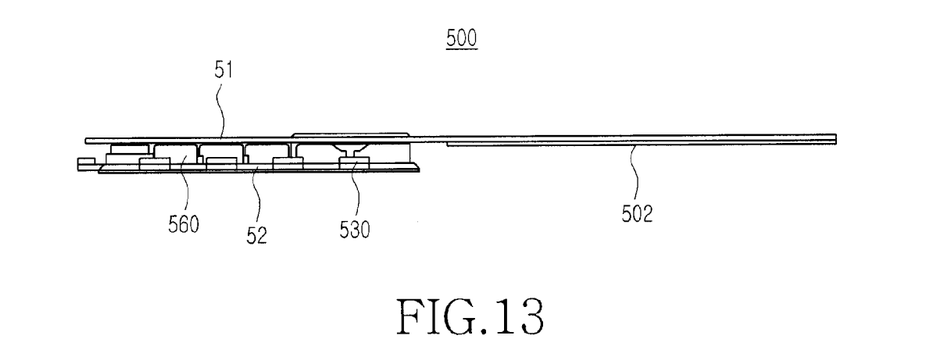
FIG. 13 is a side view of the keypad assembly shown in FIG. 11.
Figure 14A:
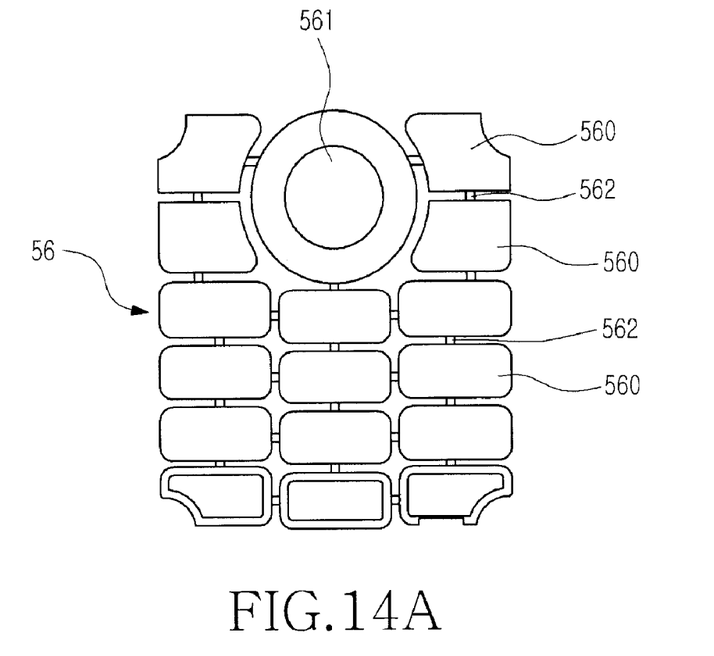
FIG. 14A is a front view of a key bracket on a keypad assembly according to the second exemplary embodiment of the present invention.
Figure 14B:
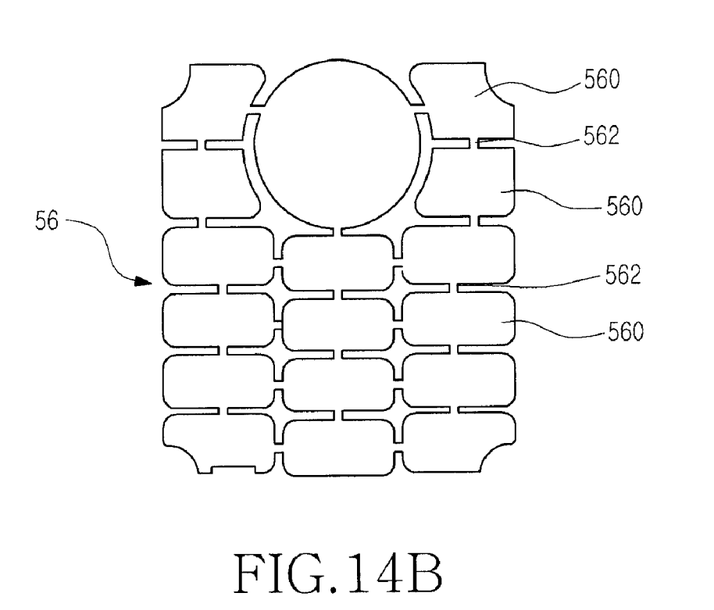
FIG. 14B is a bottom view of the key bracket shown in FIG. 14A.

In conclusion, the key bracket 56 is installed to safely transfer the pressure of a selected key top 504 on the keypad top 51 to the elastic body 52. The key bracket 56 includes a plurality of key bodies 560 associated with the key tops 504, and the key bodies 560 are integrally injection-molded. The key bodies 560 on the key bracket 56 are made of a rigid material to directly transfer a force by a pressure to the elastic body 52 (FIG. 13). The key bodies 560 are integrally connected by a plurality of connecting portions 562. The connecting portions 562 are provided to manufacture the key bracket 56 by injection molding. While the key bodies 560 are made of a rigid material, the connecting portions 562 (FIGS. 14A and 14B) are preferably shaped in the form of a wire having a very small diameter to retain elastic force. As a result, when the selected key top 504 is pressed down, the key bodies 560 may move up and down without interfering with each other. The key bracket 56 is made preferably of transparent plastics and serves as a waveguide for an undepicted light guide.

Meanwhile, the key bracket 56 has a cylindrical key body 561 provided on a place where a navigation key is mounted.

Referring now to FIGS. 9, 10, 15A and 15B, the elastic body 52 is a device for transferring a force applied from the key bracket to the metal domes and returning the key bracket to its original location. A plurality of openings 522 to 526 (FIGS. 15A and 15B) are formed in the places between the key bodies 560 to facilitate smooth pressure and recovery of the key tops. That is, if the selected key top is pressed down, with the openings 522 to 526 formed on the elastic body 52, one key body 560 just under the pressed key top moves down with minimized interference with other key bodies, pushing down its associated metal dome. Assuming that there is no opening in the elastic body 52, if the selected one key body 560 is pressed down, the pressure force is transferred to other key bodies, causing improper key manipulation.

Figure 15A:
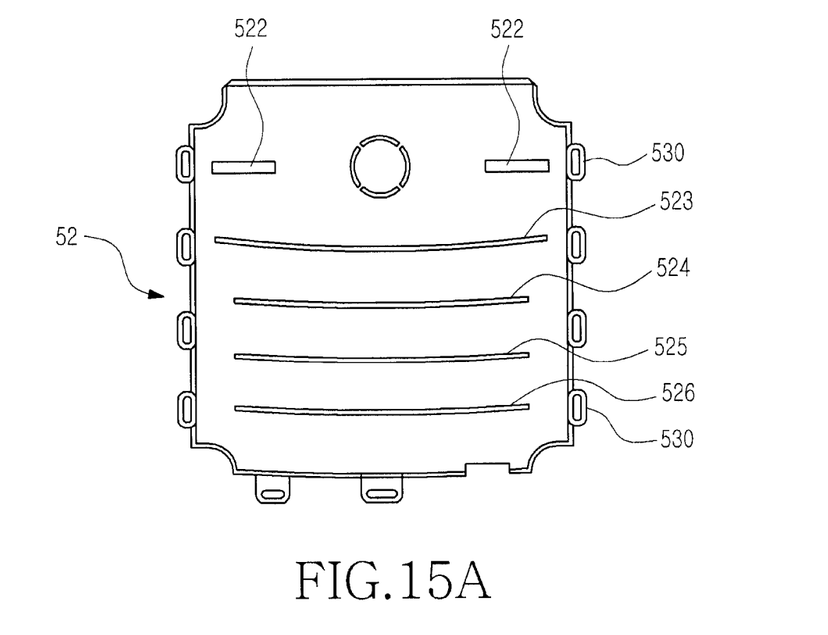
FIG. 15A is a front view of an elastic body of a keypad assembly according to the second exemplary embodiment of the present invention.
Figure 15B:
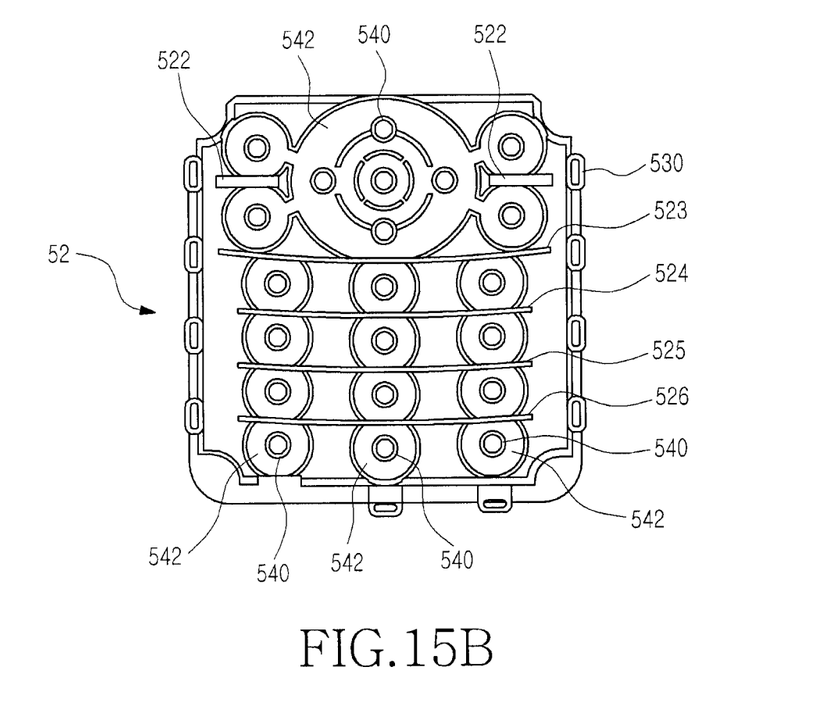
FIG. 15B is a bottom view of the elastic body shown in FIG. 15A.

The openings 522 to 526 have a long shape extending in a horizontal direction between the key bodies 560, and a plurality of openings are arranged along a vertical direction between the key bodies 560. That is, paired openings 522 are provided preferably at both sides of an area where the navigation key is disposed, and four openings 523 to 526 are arranged preferably along the vertical direction between the remaining key bodies.

The elastic body 52 further has a plurality of holders 530 that are integrally molded along its circumference, and the elastic body 52 is fixed to a proper place of the portable terminal by the holders 530. A plurality of actuators 540 projecting in the bottom direction are integrally molded in the places associated with the key bodies 560 on the bottom of the elastic body 52. The actuators 540 are formed in the form of a protrusion to transfer the pressure from the key bracket 56 to the metal domes 571 and return the key bracket 56 to its original position.

Recesses 542 (FIG. 15B) are further formed along the circumferences of the actuators 540 on the bottom of the elastic body 52 to facilitate smooth pressure and recovery of the actuators 540. That is, the circumferences of the actuators 540 formed on the bottom of the elastic body 52 are formed so as to be relatively thin to facilitate smooth movement of the actuators 540. The elastic body 52 is made preferably of a semi-transparent material to wave-guide light received from an undepicted light source. The light from the undepicted light source is wave-guided to the keypad top 51 through the key bracket 56 via the actuators 540.

Figure 11:
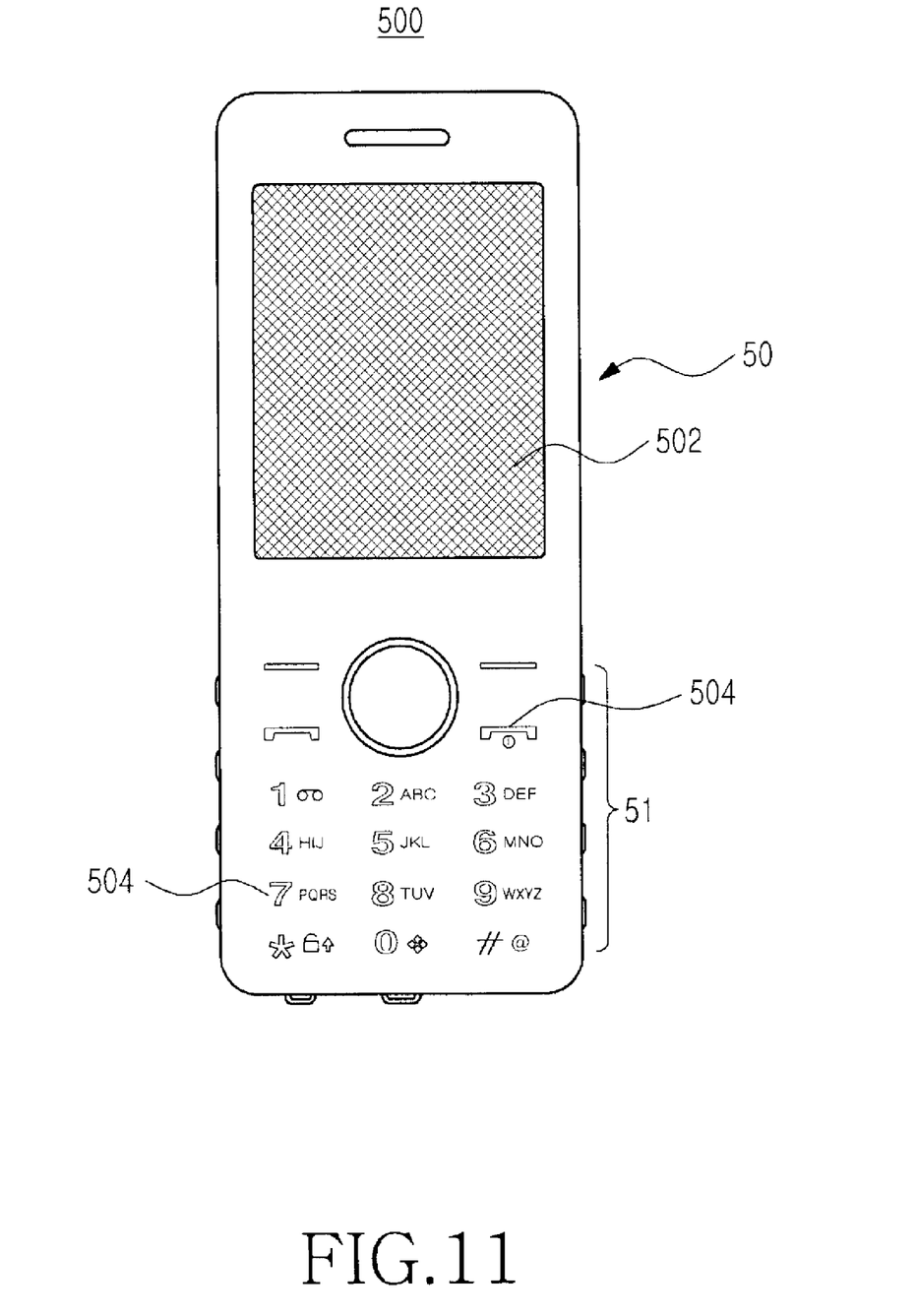
FIG. 11 is a front view of an assembled keypad assembly according to the second exemplary embodiment of the present invention.
Figure 12:
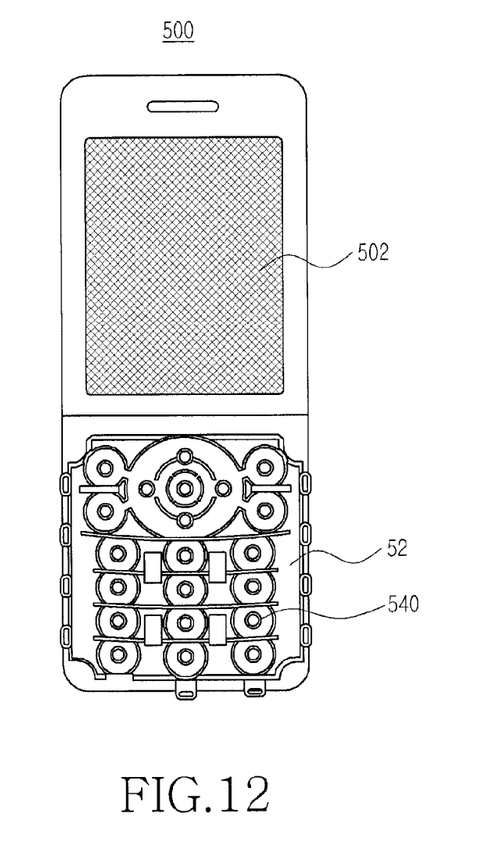
FIG. 12 is a bottom view of the keypad assembly shown in FIG. 11.

FIG. 11 is a front view of a keypad assembly 500 assembled in an upper casing according to an exemplary embodiment of the present invention. FIG. 12 is a bottom view of the keypad assembly shown in FIG. 11. FIG. 13 is a side view of the keypad assembly shown in FIG. 11.

Referring now to FIGS. 11 to 13, the key bodies 560 on the key bracket 56 are arranged maintaining a small gap with the keypad top 51 on the window keypad 50, and the key bodies 560 are adhered to the elastic body 52 preferably by adhesive means. Though the actuators 540 are not seen from the side in FIG. 13 as they are projected by a depth of the recesses 542, length of the actuators 540 is subject to change during the design.

Figure 16:
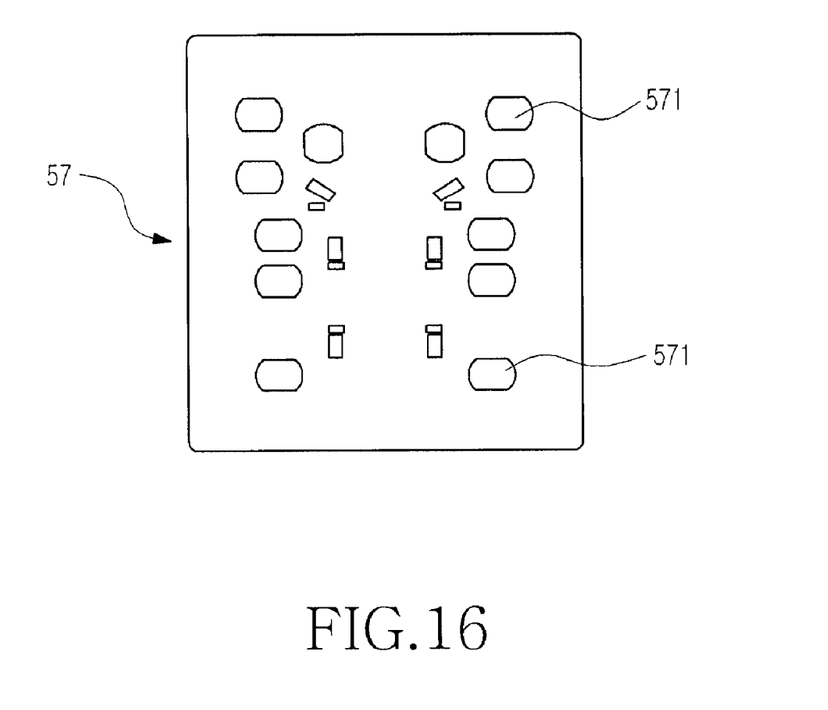
FIG. 16 is a front view of a dome sheet mounted in a keypad assembly according to the second exemplary embodiment of the present invention.

FIG. 16 is a front view of a dome sheet 57 according to an exemplary embodiment of the present invention. Referring now to FIG. 16, a dome sheet 57 is used in place of the conventional dome sheet FPCB, considering improved ease of assembly. The dome sheet 57, where metal domes 571 are provided in a proper place, is adhered onto a PCB. That is, the present invention omits the separate process of connecting connectors on the dome sheet FPCB, thereby improving the ease of assembly.

In this structure, if the user presses down a desired key top 504, the pressure force is transferred to the elastic body 52 through the associated key body 560, and the key body 560 pushes down the associated actuator 540 just thereunder. Then the associated metal dome 571 is pressed down by the pressure of the actuator 540, generating an applied signal. Meanwhile, if the pressure force is removed, the pressed key top 504 returns to its original position by the elasticity of the associated metal dome 571, actuator 540 and key tope 504. In this way, according to the present invention, the openings 522 to 526 and the recesses 542 increase elastic movement of the elastic body 52.

As is apparent from the foregoing description, according to the exemplary embodiments of the present invention, a transparent display window disposed on a front face of a portable terminal, and a keypad top, or key tops, manipulated directly by the user, are integrally molded into a single part. Hence, two parts can be assembled at a time, thereby achieving cost reduction by a decrease in man-hours required for construction and providing elegant exterior of the front face.

In addition, the present invention replaces the dome sheet FPCB with the dome sheet, contributing to cost reduction, and a distance between the keypad top and the metal domes can be acquired with use of a key bracket, thereby improving the click feeling.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A keypad assembly for a portable terminal, comprising:
   a window keypad including a display window and a keypad top;
   an elastic body arranged below a bottom surface of the keypad top;
   a board including a dome sheet that is disposed under the elastic body and
   a key bracket interposed between the keypad top and the elastic body and having a plurality of key bodies associated with the key tops,
   wherein the elastic body includes a plurality of openings formed in associated places between the plurality of key bodies to facilitate transfer of pressure and recovery of the key tops, and for minimizing interference to adjacent key bodies.

2. The keypad assembly of claim 1, wherein the display window is assembled on the front face of the portable terminal on a same plane as that of the keypad top in a vertical downward direction.

3. The keypad assembly of claim 1, wherein alphanumeric letters and symbols are printed on a bottom surface of the keypad top.

4. The keypad assembly of claim 1, wherein the keypad top includes a plurality of contact bosses projecting in a bottom direction, and the contact bosses are comprised of an elastic material and adhered to a bottom surface of the keypad top.

5. The keypad assembly of claim 4, wherein the keypad top comprises a plurality of key tops that are integrally molded in a form of a panel.

6. The keypad assembly of claim 5, wherein the plurality of contact bosses are integrally molded on a single sheet, which is adhered to a bottom surface of the keypad top, so that the plurality of contact bosses extend in a bottom direction.

7. The keypad assembly of claim 6, wherein the sheet and the plurality of contact bosses are comprised of a same material, and integrally molded with a silicon rubber material.

8. The keypad assembly of claim 6, wherein the bottom of the keypad top and a top of the sheet are formed flat.

9. A keypad assembly for a portable terminal, comprising:
   a window keypad including a keypad top with a plurality of key tops thereon, and assembled on a front face of the portable terminal in a vertical downward direction;
   an elastic body arranged below a bottom surface of the keypad top, said elastic body being movable from pressure exerted by a selected key top;
   a board including a dome sheet that is disposed under the elastic body face-to-face; and
   a key bracket interposed between the keypad top and the elastic body for transferring the pressure of the selected key top to the dome sheet, wherein the key bracket includes a plurality of key bodies associated with the key tops, and the elastic body has a plurality of openings formed in associated places between the plurality of key bodies to facilitate transfer of pressure and recovery of the key tops, and for minimizing interference to adjacent key bodies.

10. The keypad assembly of claim 9, wherein the key bodies are comprised of a rigid material.

11. The keypad assembly of claim 9, wherein the key bodies are integrally connected by a plurality of connecting portions.

12. The keypad assembly of claim 9, wherein each of the openings extends in a horizontal direction between the key bodies, and a plurality of openings are arranged along a vertical direction between the key bodies.

13. The keypad assembly of claim 9, wherein the key bracket is comprised of transparent plastics for serving as a waveguide.

14. The keypad assembly of claim 9, wherein the elastic body has a plurality of holders integrally molded along a circumference thereof for fixing the elastic body to a predetermined position of the portable terminal.

15. The keypad assembly of claim 9, wherein the elastic body is comprised of a semitransparent material and serves as a waveguide.

16. The keypad assembly of claim 9, wherein the window keypad has a display window adhered to a bottom surface thereof.

17. The keypad assembly of claim 16, wherein the key bracket is integrally connected with a display unit under the display window.

18. The keypad assembly of claim 9, wherein a plurality of actuators projecting in a bottom direction are integrally molded at positions corresponding to the key bodies on a bottom of the elastic body.

19. The keypad assembly of claim 18, wherein recesses are formed on the bottom of the elastic body along circumferences of the actuators to facilitate transfer of pressure and recovery of the actuators.

* * * * *

UNITED STATES PATENT AND TRADEMARK OFFICE
CERTIFICATE OF CORRECTION

PATENT NO. : 8,227,715 B2
APPLICATION NO. : 12/696288
DATED : July 24, 2012
INVENTOR(S) : Park et al.

It is certified that error appears in the above-identified patent and that said Letters Patent is hereby corrected as shown below:

In the Claims:
Column 9, Claim 1, Line 31, should read as follows:
--...elastic body; and...--

Signed and Sealed this
Seventh Day of May, 2013

Teresa Stanek Rea
*Acting Director of the United States Patent and Trademark Office*